United States Patent [19]

Trubiano

[11] Patent Number: 5,211,410
[45] Date of Patent: May 18, 1993

[54] HINGEABLE BABY SEAT BACKREST FOR SHOPPING CART

[75] Inventor: Antoine Trubiano, Montreal, Canada

[73] Assignee: Cari-All Inc., Montreal, Canada

[21] Appl. No.: 878,078

[22] Filed: May 4, 1992

[51] Int. Cl.[5] .............................................. B62B 3/00
[52] U.S. Cl. ............................ 280/33.993; 292/259 R
[58] Field of Search ................... 292/259 R, DIG. 29; 280/33.993, 33.991, 33.992; 220/334

[56] References Cited

U.S. PATENT DOCUMENTS

| | | | |
|---|---|---|---|
| Re. 32,453 | 7/1987 | Stover et al. | 280/33.993 |
| 244,889 | 7/1881 | Hahn | 292/DIG. 29 X |
| 318,635 | 5/1885 | Lehman | 292/DIG. 29 X |
| 357,985 | 2/1887 | Frisbie | 292/DIG. 29 X |
| 4,423,882 | 1/1984 | Stover et al. | 280/33.993 |
| 4,682,782 | 7/1987 | Mills | 280/33.993 |
| 4,875,695 | 10/1989 | Badger et al. | 280/33.993 |

Primary Examiner—Margaret A. Focarino
Assistant Examiner—Michael Mar
Attorney, Agent, or Firm—Longacre & White

[57] ABSTRACT

A hinge gate construction for a baby seat compartment of the type which is securable to a rear portion of an elevated frame of an over-the-counter shopping cart. The gate is hingedly secured under the bottom wall of the baby seat compartment and the main merchandise-carrying basket, and is displaceable from an upright arrested position to a collapsed position forwardly over the bottom wall of the merchandise carrying compartment. A sliding latch is displaceably secured in a top portion of the gate and has engageable extensions disposed outwardly of opposed end edges of the gate. These extensions are received in restraining cavities formed in a front edge of each of opposed side walls of the baby seat compartment by displacing the sliding latch upwardly to engage in these cavities. The gate is disengaged from the cavities by sliding the latch upwardly and hinging the gate forwardly over the bottom wall of the merchandise carrying basket.

8 Claims, 3 Drawing Sheets

HINGEABLE BABY SEAT BACKREST FOR SHOPPING CART

TECHNICAL FIELD

The present invention relates to an improved hinge gate construction for a baby seat compartment and wherein the gate is hingedly secured under the baby seat bottom wall and is actuable from an upright to a collapsed position by means of a finger engageable sliding latch displaceably secured in a top portion of the gate and retained within cavities integrally formed in a front edge of the side walls of the baby seat compartment.

BACKGROUND ART

Various types of baby seat compartments having hingeable backrests or gates are known for securement to the rear portion of the elevated frame of an over-the-counter shopping cart, and such is for example disclosed in U.S. Pat. Nos. 4,682,782; 4,875,695; and 4,423,887 and its reissue RE 32,453. The present invention is an improved hinge gate design which substantially overcomes some of the disadvantages and inconveniences of known hinge gate designs of the type exemplified by the above-referenced patents. One disadvantage of these designs is that the hinge for the gate is located above the baby seat bottom wall or the lading-carrying basket bottom wall, and this can lead to damage to the clothing of a child seated in the baby seat, or the child, or to articles disposed on the baby seat. Also, the hinge rods of these gates usually have a stud end which extends outwardly of the side walls of the compartment which can also catch articles of clothing of a person in close proximity to this side wall.

The hinge connection of some of these gates are also slidingly captive in brackets secured to the side walls of the baby seat compartment and utilize split ring clips to restrain the transverse displacement of the gate secured about a hinge rod. These split rings can become undone and can cause the gate to become detached. Also, these rings have burrs which can cause injury to a child's hand when sitting in the baby seat compartment, as above described. Furthermore, latches have been secured to the opposed side walls of the baby seat compartment, and extend inwardly thereof to retain the gate upright. This has also proven hazardous and causes malfunction of the gate when these latches become slightly bent, as they will no longer permit the gate to be engaged. These latches can also prevent the lading-carrying basket from being fully hinged up in the storage position, thereby risking the possibility of the lading-carrying basket that can accidently fall and injure a person. These inner latches are formed of bent metal rods with hook ends which may have burrs, and these are exposed internally of the baby seat compartment. Therefore, they can damage all sorts of articles, and especially articles of clothing placed in the baby seat compartment. A still further disadvantage of the prior art baby seat compartments with hinged gates is that they require frequent repair and maintenance.

SUMMARY OF INVENTION

It is a feature of the present invention to provide an improved hinge gate construction for a baby seat compartment which is secureable to an over-the-counter shopping cart, and which substantially overcomes the above-mentioned disadvantages of the prior art.

Another feature of the present invention is to provide an improved hinge gate construction for a baby seat compartment and wherein the gate is hinged below the bottom wall of the baby seat compartment.

Another feature of the present invention is to provide an improved hinge gate construction for a baby seat compartment and wherein a sliding latch is displaceably secured in a top portion of the rectangular frame with the hinge connection being a stationary hinge connection.

Another feature of the present invention is to provide an improved hinge gate construction for a baby seat compartment wherein the gate is restrained within cavities formed integrally in a front edge of the opposed side walls of the baby seat compartment, therefore having no inwardly extending latch members within the compartment.

According to the above features, from a broad aspect, the present invention provides a hinge gate construction for a baby seat compartment securable to a rear portion of an elevated frame of a shopping cart. A main forward merchandise-carrying basket having a bottom wall and an open rear end is secured to a forward portion of the frame. The baby seat compartment has opposed side walls, a rear wall with leg holes and a bottom wall. The hinge gate has a rectangular frame which forms a front wall for the baby seat compartment. A pair of spaced hinge connectors extend from a bottom edge of the rectangular frame. The hinge connectors are secured under the bottom wall of the baby seat compartment and the merchandise-carrying basket, and permits the rectangular frame to be displaced from an upright arrested position to a substantially horizontal collapsed position forwardly over the the bottom wall of the merchandise-carrying compartment, which is substantially in the same plane as the bottom wall of the baby seat compartment, to expand the area of the basket. A sliding latch is displaceably secured in a top portion of the rectangular frame and has engageable extensions disposed outwardly of opposed end edges of the rectangular frame. The sliding latch being a finger engageable sliding member which is retained captive between guide means provided in the rectangular frame and accessible in a top portion thereof. Restraining means is provided in the opposed side walls to receive and retain a respective one of the engageable extensions therein to arrest the rectangular frame in the upright position.

BRIEF DESCRIPTION DRAWINGS

A preferred embodiment of the present invention will now be described with reference to the accompanying drawings, in which.

DESCRIPTION OF PREFERRED EMBODIMENTS

Figure 1:
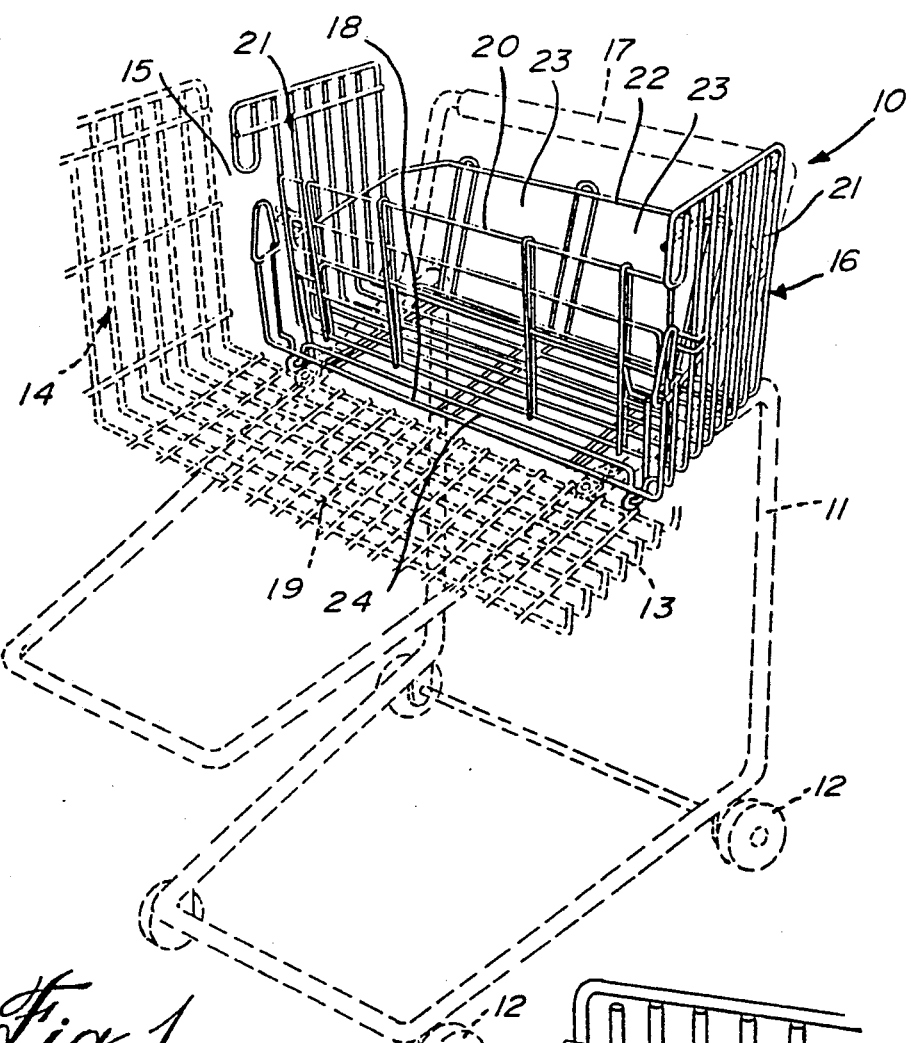
FIG. 1 is a perspective view of an over-the-counter shopping cart on which there is secured a baby seat compartment having the hinge gate design of the present invention.

Referring now to the drawings, and more particularly to FIG. 1, there is shown generally at 10 an over-the-counter shopping cart which comprises essentially a frame 11 mounted on casters 12 and having an upper horizontally disposed frame section 13 on which there is secured a main forward merchandise-carrying basket 14 having an open rear end 15 and a rear baby seat compartment 16 secured to the rear portion of the horizontal frame section 13. A handlebar 17 is provided to push the cart on the casters 12. The main forward merchandise-carrying basket 14 is hingeable along the rear edge 18 of the bottom wall 19 thereof to tilt upwardly over and about the baby seat compartment 16. The present invention is concerned with an improved construction of the baby seat compartment 16, and particularly the hinge gate 20 and its attachment, which constitutes the front wall or backrest of the baby seat compartment 16.

Figure 2:
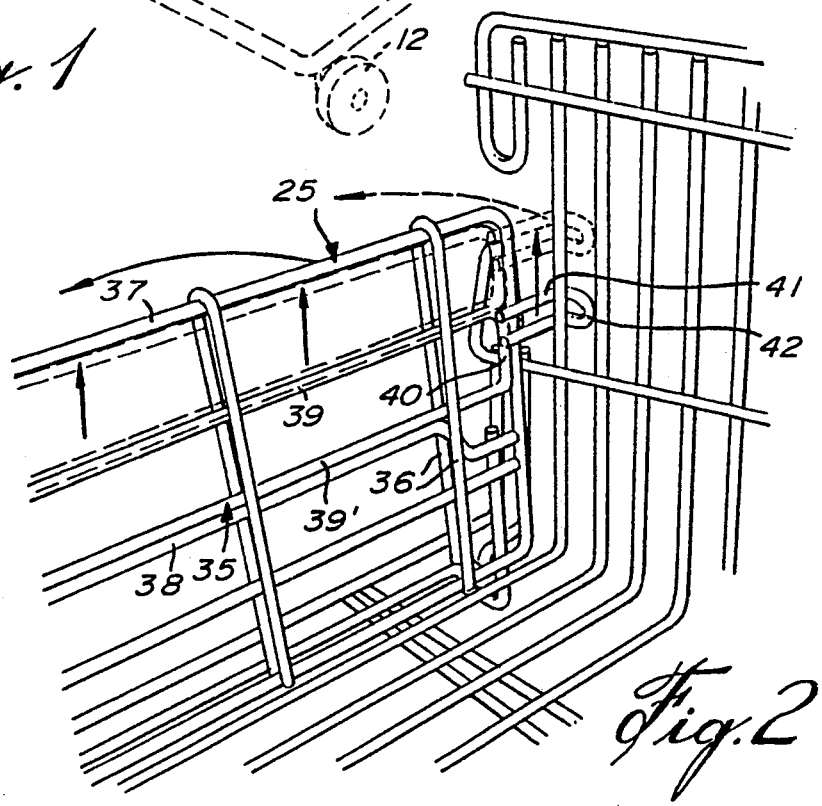
FIG. 2 is a fragmented, partial perspective view of a baby seat compartment constructed with the hinge gate design of the present invention.
Figure 3:
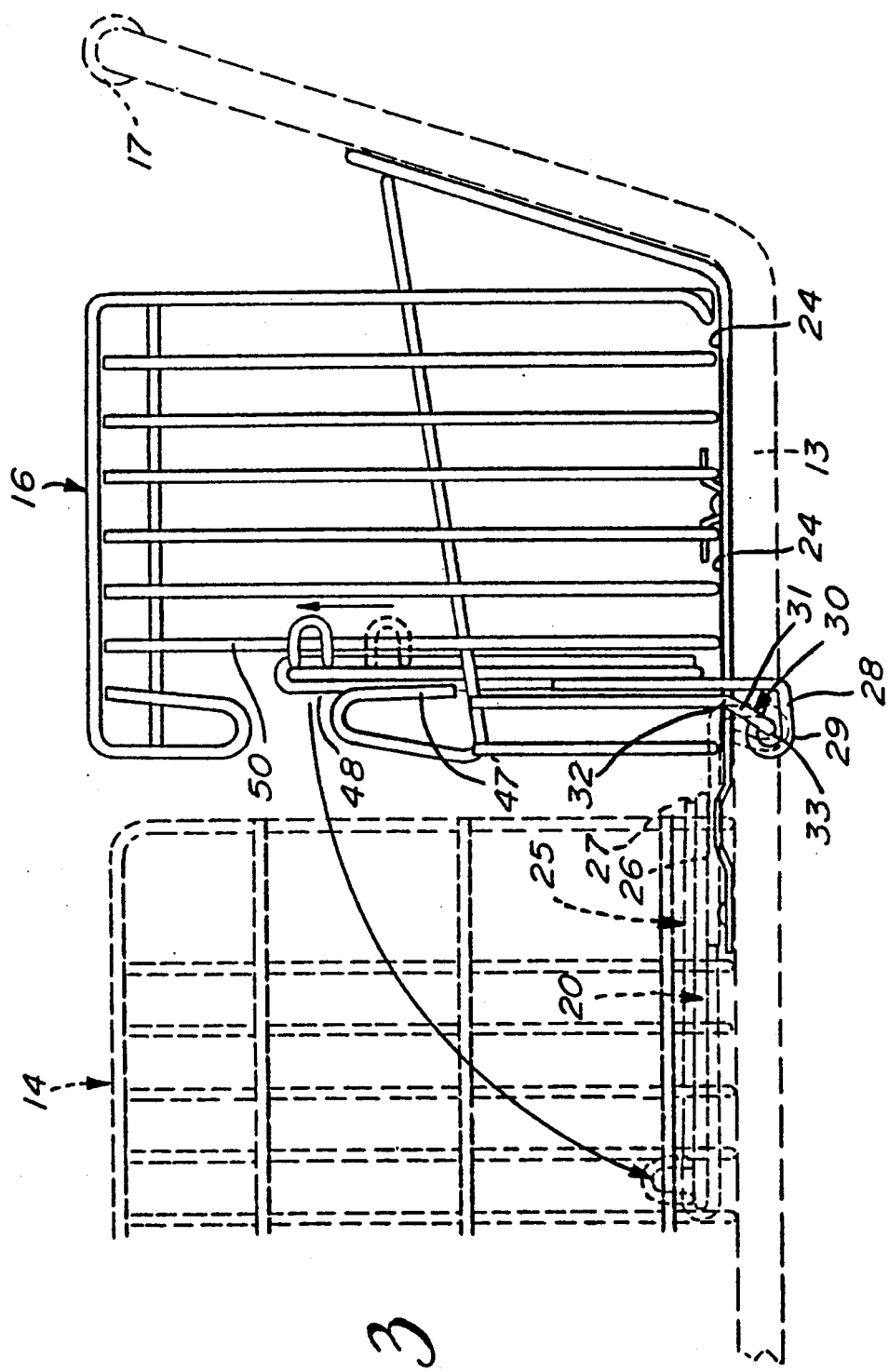
FIG. 3 is a side view, partly fragmented, showing the hinge gate in its collapsed position.
Figure 4:
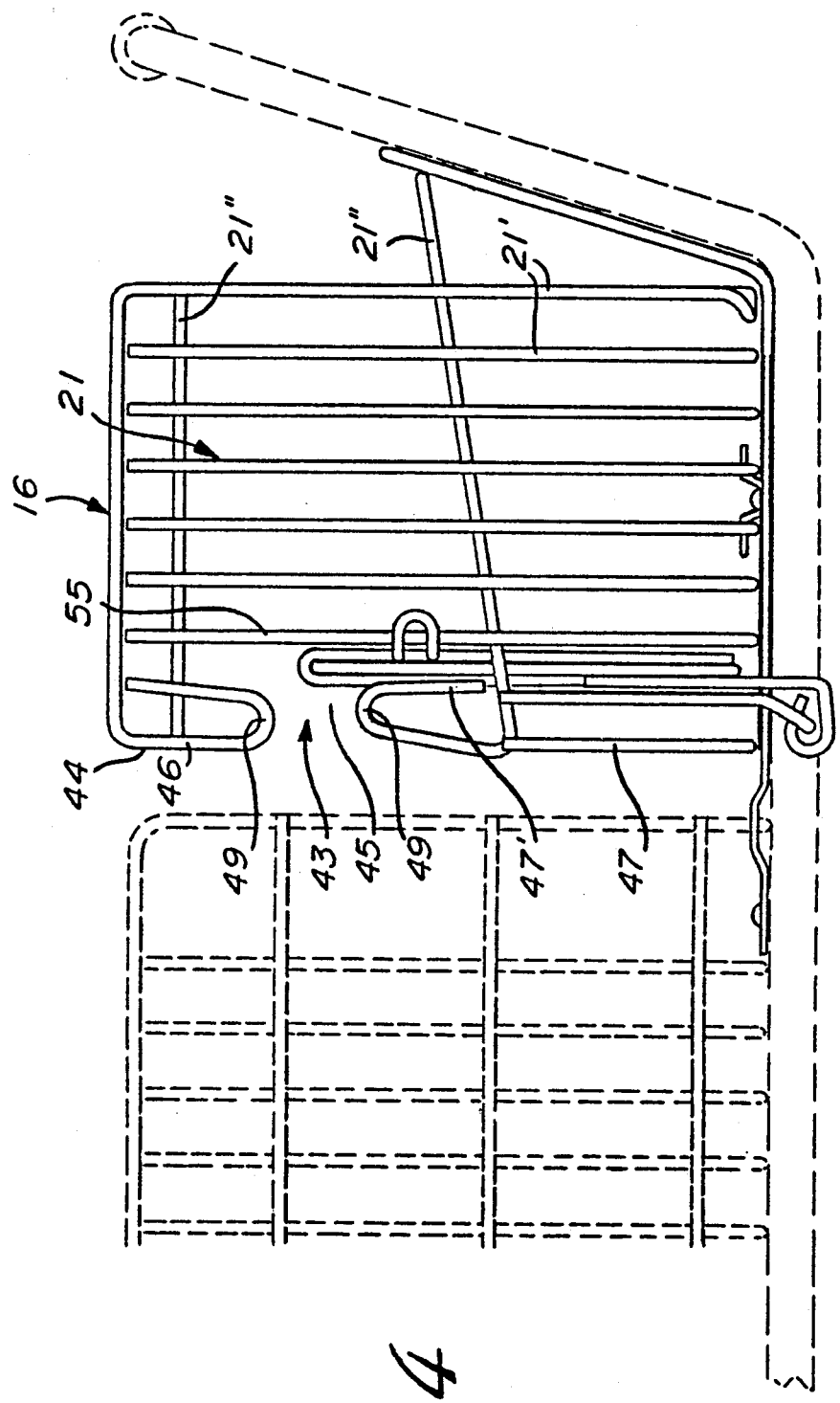
FIG. 4 is a view similar to FIG. 3, but showing the hinge gate in its upright engaged position.

Referring now additionally to FIGS. 2 to 4, there will be described the construction and operation of the hinge gate 20. The baby seat compartment is constructed of steel wire rods which are shaped to define component parts thereof, and this compartment is comprised essentially by opposed side walls 21, a rear wall 22 having leg holes 23, a bottom wall 24, and the hinge gate 20.

The hinge gate 20 is defined by a substantially rectangular wire rod frame 25 and is provided with a pair of rear-spaced apart hinge connectors, herein defined by straight rod sections 26, secured vertically with the rectangular frame and extending a predetermined distance from a bottom edge 27 of the frame 25. The rod sections 26 have forward rod extension portions 28 disposed substantially transverse to the plane of the rectangular gate, and spaced below the bottom edge 27. At the free end of the extension portion 28 there is formed a securement loop 29. These loops 29 are securable about a stationary hinge connector 30. The hinge connector is constituted by a pair of downwardly extending U-shaped wire rod sections 31 formed in the opposed end regions of a bottom wall rod 32 positioned in a forward region of the baby seat bottom wall 24. The integrally formed connecting rod section 33 of the U-shaped rod section constitutes a stationary pivot rod. Accordingly, the shape of the extension portions 28 permits the rectangular frame 25 to be displaced from a collapsed position, as shown in FIG. 3 where the frame lies substantially horizontally over the bottom wall 19 of the merchandise-carrying basket 14, to a position of use which is an upright arrested position, as shown in FIG. 4. The bottom wall 19 of the merchandise-carrying basket is substantially in the same plane as the bottom wall 24 of the baby seat compartment 16.

In order to secure the gate 20 in its upright position as shown in FIG. 4, there is provided a sliding latch member 35 which is retained captive between two or more pairs of guide wires 36 secured vertically within the rectangular frame 25 and forming guide channels. The sliding latch 35 is retained in a top portion of the rectangular frame and is displaceable between the top horizontal rod 37 and a spaced lower adjacent horizontal rod 38. The sliding latch is constituted by an elongated rectangular wire loop having spaced parallel horizontal wire sections 39 and a short transverse end wire section 40. To this transverse end wire section 40 is secured an engageable extension member constituted of a further small wire loop 41 welded to a respective one of the transverse end wire sections 40. The extension members or wire loops 41 each have an inwardly turned free end portion 42. The extension members are retained within a respective restraining means defined by a cavity 43 formed in a front edge 44 of the opposed side walls 21 of the baby seat compartment 16.

As shown more clearly in FIGS. 3 and 4, the side walls are formed from vertically extending wire rods 21' and a few cross rods 21''. The cavity 43 is defined by a mouth opening 45 formed between opposed inwardly turned front edge rods 46 and 47, both of which are looped back and shaped to define a smooth rounded shape rod section 49 adjacent the mouth opening 45. The lower front edge rod is also inclined rearwardly to facilitate placement of the extension members within the mouth opening.

A recessed holding trough 48 is defined between the inturned rod section 47' of rod 47, which is inwardly and downwardly shaped, and an adjacent vertical rod 50. The recessed holding trough 48 receives and restrains a respective one of the engageable extensions 41 secured to the opposed ends of the sliding latch 35.

In order to engage the extensions of the sliding latch within the holding trough 48 to retain the gate in its upright position, as shown in FIG. 4, it is necessary to move the sliding latch upwardly between the guide rods 36 which are secured to the transverse rods of the rectangular frame to position the extensions 41 in line with the mouth opening 45. The gate is then drawn rearwardly with the engageable extension loop 41 entering into the mouth opening 45, or until the wire loop 41 touches the vertical rod 55 in the side wall 21 of the baby seat compartment. The sliding latch is then released and falls by gravity until the lowermost rod 39' of the sliding latch abuts the adjacent horizontal rod 38 in the rectangular frame 25. The extension loop 41 is thus restrained between the rear rod section 47' and the vertical rod 55 and cannot be displaced forwardly or rearwardly.

To disengage the gate from its upright position the sliding latch is engaged by the hand and pulled upwardly, and the gate is pushed forwardly with the engageable extensions aligned with the mouth openings. Because the front wire rods have a rounded end section 49 adjacent the mouth opening, it guides the engageable extension loop 41 out of the mouth opening if not perfectly aligned. The gate is then placed or dropped on the bottom wall 19 of the merchandise-carrying basket 14.

As can be seen, the hinge gate construction of this baby seat compartment achieves the advantages and features of the present invention in that the hinge is located below the bottom wall of the baby seat compartment, the hinge is stationary (not a floating hinge), no latching or restraining parts extend inwardly of the baby seat compartment side walls to retain the gate in its upright position, and the sliding latch is easy to operate. It is also within the ambit of the present invention to provide a different hinge connection located below the baby seat compartment bottom wall, but achieving the same function as the one disclosed herein. For example, the hinge connecting rod extension 28 may be a shallow U-shape rod extension secured by a stationary loop or a clamp retained under the tubular horizontal frame members 13. The sliding latch 35 may have a different configuration as well as the engageable extensions at the ends thereof.

I claim:

1. A hinge gate construction for a baby seat compartment secureable to a rear portion of an elevated frame of a shopping cart, a main forward merchandise-carrying basket having a bottom wall and an open rear end secured to a forward portion of said frame; said baby seat compartment having opposed side walls, a rear wall with leg holes and a bottom wall; said hinge gate being a rectangular frame forming a front wall for said baby seat compartment, a pair of spaced hinge connectors extending from said bottom edge of said rectangular frame, said hinge connectors being secured under said bottom wall of said baby seat compartment and permitting said rectangular frame to be displaced from an upright arrested position to a substantially horizontal collapsed position forwardly over said bottom wall of said merchandise-carrying compartment which is substantially in the same plane as said bottom wall of said baby seat compartment to expand the area of said basket, a sliding latch displaceably secured in a top portion of said rectangular frame and having engageable extensions disposed outwardly of opposed end edges of said rectangular frame, said sliding latch being a finger engageable sliding member retained captive between guide means provided in said rectangular frame and accessible in a top portion of said rectangular frame, and restraining means in said opposed side walls to receive and retain a respective one of said engageable extensions therein to arrest said rectangular frame in said upright position, wherein said restraining means is a cavity formed in a front edge of each of said opposed side walls, said side walls being formed of wire rods, said cavity having a mouth opening and a recessed holding trough to restrain said engageable extension and maintain said rectangular frame upright.

2. A hinge gate as claimed in claim 1 wherein said hinge connectors extend downwardly from a bottom edge of said rectangular frame in the plane of said frame and have a forward extension with an engaging end to hingedly engage a stationary pivot element.

3. A hinge gate as claimed in claim 2 wherein said hinge connectors are straight rod sections secured vertically with said rectangular frame and extending a predetermined distance form said bottom edge, said forward extension being a rod section of said straight rod disposed transversely forward and defining a loop engaging free end to engage said stationary pivot element.

4. A hinge gate as claimed in claim 3 wherein said pivot connection is a downwardly extending U-shape rod section formed in opposed end regions of a bottom wall rod positioned in a forward region of said baby seat compartment bottom wall, said pivot element being a connecting rod section of said U-shape section.

5. A hinge gate as claimed in claim 1 wherein said mouth opening is defined between opposed inwardly turned front edge rod sections of said side walls, said trough being formed between an inwardly and downwardly shape rear extension of a bottom one of said front edge rod sections and a portion of an adjacent vertical rod.

6. A hinge gate as claimed in claim 5 wherein said bottom one of said front edge rod section is rearwardly inclined, both said inwardly turned front edge rods having a smooth rounded shape in their free ends between which said mouth opening is defined.

7. A hinge gate construction for a baby seat compartment secureable to a rear portion of an elevated frame of a shopping cart, a main forward merchandise-carrying basket having a bottom wall and an open rear end secured to a forward portion of said frame; said baby seat compartment having opposed side walls, a rear wall with leg holes and a bottom wall; said hinge gate being a rectangular frame forming a front wall for said baby seat compartment, a pair of spaced hinge connectors extending from said bottom edge of said rectangular frame, said hinge connectors being secured under said bottom wall of said baby seat compartment and permitting said rectangular frame to be displaced from an upright arrested position to a substantially horizontal collapsed position forwardly over said bottom wall of said merchandise-carrying compartment which is substantially in the same plane as said bottom wall of said baby seat compartment to expand the area of said basket, a sliding latch displaceably secured in a top portion of said rectangular frame and having engageable extensions disposed outwardly of opposed end edges of said rectangular frame, said sliding latch being a finger engageable sliding member retained captive between guide means provided in said rectangular frame and accessible in a top portion of said rectangular frame, said sliding member is an elongated rectangular loop retained captive between two spaced apart horizontal rods in a top portion of said rectangular frame, said guide means being constituted by two or more transversely spaced pairs of restraining rods, each restraining rod of each pair being secured transversely aligned with each other and secured to a respective side and across said two horizontal rods to define guide channels therebetween; and restraining means in said opposed side walls to receive and retain a respective one of said engageable extensions therein to arrest said rectangular frame in said upright position.

8. A hinge gate construction for a baby seat compartment secureable to a rear portion of an elevated frame of a shopping cart, a main forward merchandise-carrying basket having a bottom wall and an open rear end secured to a forward portion of said frame; said baby seat compartment having opposed side walls, a rear wall with leg holes and a bottom wall; said hinge gate being a rectangular frame forming a front wall for said baby seat compartment, a pair of spaced hinge connectors extending from said bottom edge of said rectangular frame, said hinge connectors being secured under said bottom wall of said baby seat compartment and permitting said rectangular frame to be displaced from an upright arrested position to a substantially horizontal collapsed position forwardly over said bottom wall of said merchandise-carrying compartment which is substantially in the same plane as said bottom wall of said baby seat compartment to expand the area of said basket, a sliding latch displaceably secured in a top portion of said rectangular frame and having engageable extensions disposed outwardly of opposed end edges of said rectangular frame, said engageable extensions are wire loops each secured to opposed ends of said sliding member, said wire loops each having an inwardly turned free end portion, said sliding latch being a finger engageable sliding member retained captive between guide means provided in said rectangular frame and accessible in a top portion of said rectangular frame, and restraining means in said opposed side walls to receive and retain a respective one of said engageable extensions therein to arrest said rectangular frame in said upright position.

* * * * *